3,576,812
1,5-METHANO-3-BENZAZOCINE DERIVATIVES
Karel Wiesner and Jarvis G. McCluskey, Fredericton, New Brunswick, Canada, assignors to American Home Products Corporation, New York, N.Y.
No Drawing. Filed July 2, 1968, Ser. No. 741,894
Int. Cl. C07d 39/00
U.S. Cl. 260—294.7                       11 Claims

ABSTRACT OF THE DISCLOSURE

There are disclosed herein 1,5-methano-1-methyl-3-benzazocines optionally substituted in position 3 with methyl, allyl, 3,3-dimethylallyl, cyclopropylmethyl, anilinoethyl, 3-anilinopropyl, phenethyl, 3-phenylpropyl, 2-hydroxyphenethyl, 3-hydroxy-3-phenylpropyl, phenacyl, 3-oxo-3-phenylpropyl, cinnamyl, p-aminophenethyl, or 3-(p-aminophenyl)propyl groups; in position 9 with a hydroxy or a methoxy group; and in position 11 with a methyl, a hydroxy, or an amino group. The key intermediates for the preparation of the above compounds, 1,2,5,6 - tetrahydro - 1 - methyl - 1,5 - methano - 3 - benzazocine-4,11(3H)-diones optionally substituted in position 9 with a hydroxy or a methoxy group, the process for preparing the above intermediates, and the processes for preparing the corresponding 1,5 - methano-1-methyl-3-benzazocines and their derivatives listed above from the above intermediates are also disclosed. The 1,5-methano-1-methyl-3-benzazocines disclosed above have analgesic, anti-inflammatory, and cholesterol biosynthesis inhibiting properties, and methods for their pharmacological use are also given.

This invention relates to a novel series of methanobenzazocines, the processes for the preparation of these compounds and to intermediates used for their preparation.

More specifically this invention relates to substituted 1,5-methano-3-benzazocine derivatives which may preferably be represented by Formula I:

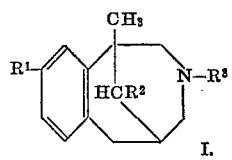

in which $R^1$ represents a hydrogen atom, a hydroxy or a methoxy group; $R^2$ represents a hydrogen atom, a lower alkyl group, such as, for example, a methyl group, a hydroxy or an amino group; and $R^3$ represents a hydrogen atom, or one of the following organic radicals: an alkyl or a substituted alkyl group containing from one to nine carbon atoms, such as, for example, a methyl, allyl, 3,3-dimethylallyl, cyclopropylmethyl, anilinoethyl or a 3-anilinopropyl group, an aralkyl group or a substituted aralkyl group containing from eight to nine carbon atoms, such as, for example, a phenethyl, 3-phenylpropyl, 2-hydroxyphenethyl, 3-hydroxy-3-phenylpropyl, phenacyl, 3-oxo-3-phenylpropyl, cinnamyl, p-aminophenethyl or a 3-(p-aminophenyl)propyl group.

Also included in this invention are the various optical and geometrical isomers of Formula I as defined above, for example, the cis-trans isomers resulting from the asymmetric centers at positions 1 and 11 if position 11 is substituted with an alkyl, hydroxy or an amino group, or the individual optical isomers which may be separated by fractional recrystallization of the diastereoisomeric salts formed, for instance, with d- or l-tartaric acid or D-(+)-α-bromocamphor sulfonic acid with either the cis or trans isomer. The designation "cis" is given to that geometrical isomer which has the substituent at position 11 in close proximity to the 1-methyl group and the trans designation applies to that geometrical isomer which has the substituent at position 11 in a distal positional relative to the 1-methyl group. The absolute configuration of these compounds is not known at this time.

Furthermore, this invention includes the non-toxic, pharmaceutically acceptable acid addition salts of the 1,5-methano-3-benzazocine derivatives of this invention. Such salts are prepared from suitable acids, such as inorganic acids, for instance, hydrochloric, hydrobromic, sulfuric, phosphoric, or sulfamic acid; or organic acids, for instance, acetic, maleic, lactic, ethane-disulfonic, glycolic, salicylic and fumaric acids. The acid addition salts are prepared by reacting the base with either one equivalent of acid or preferably with an excess in an organic solvent such as ether or an ethanol-ether mixture. Alternatively, an acid salt of the base, say the hydrochloride, can be reacted with a salt such as the ammonium salt of an organic acid in an aqueous mixture to form an insoluble salt by double decomposition.

The novel methanobenzazocines of this invention have been found to possess interesting pharmacological properties which render them useful as synthetic medicinals. More particularly these methanobenzazocines in standard pharmacological tests, for example, in procedures similar to those described by Ralph Banziger in "Pharmacologic Techniques in Drug Evaluation," Year Book Medical Publishers, page 392, for the testing of analgesic agents, have exhibited utility as analgesic agents, as do the analgesics, morphine and phenazocine. However, unlike morphine and phenazocine, the methanobenzazocines of this invention are substantially free of deleterious pharmacodynamic effects. An example of such a deleterious effect is the excitatory effect of morphine on the central nervous system observed in both mice, see D. L. J. Bilbey et al., Brit. J. Pharmacol., 15, 540 (1960), and man, see L. A. Woods in "Pharmacology in Medicine," V. A. Drill, ed., 2nd ed., McGraw-Hill Book Company, pages 218–221. The lack of excitation properties for the methanobenzazocines is demonstrable in pharmacological procedures, such as, for example, the procedure used by Bilbey, see reference cited above.

In addition, the methanobenzazocines of this invention possess anti-inflammatory activities and are able to inhibit the biosynthesis of cholesterol. The anti-inflammatory activity of these methanobenzazocines can be readily demonstrated in standard pharmacological procedures, such as those described by Robert A. Turner in "Screening Methods in Pharmacology," Academic Press, page 152, based on the reduction of pedal inflammation. The ability of these methanobenzazocine to inhibit cholesterol synthesis may be shown by standard methods described by Daniel Steinberg in "Advances in Pharmacology," Academic Press, volume 1, page 59. Steinberg also presents an excellent description of the scientific rationale for the therapeutic utility of such agents in the same article.

When the methanobenzazocines of this invention are employed as analgesic or anti-inflammatory agents or as inhibitors of cholesterol biosynthesis in warm-blooded animals, e.g. rats, alone or in combination with pharmacologically acceptable carriers, the proportion of which is determined by the solubility and chemical nature of the compound, chosen route of administration and standard biological practice. For example, they may be administered orally in solid form containing such excepients as starch, milk sugar, and so forth. They may also be administered orally in the form of solutions or they may be injected parenterally. For parenteral administration they may be used in the form of a sterile solution containing other solutes, for example, enough saline or glucose to make the solution isotonic.

The dosage of the present therapeutic agents will vary with the form of administration and the particular compound chosen. Furthermore, it will vary with the particular host under treatment. Generally, treatment is initiated with small dosages substantially less than the optimum dose of the compound. Thereafter, the dosage is increased by small increments until the optimum effect under the circumstances is reached. In general, the compounds of this invention are most desirably administered at a concentration level that will generally afford effective results without causing any harmful or deleterious side effects and preferably at a level that is in a range of from about 0.1 mg. to about 100 mg. per kilo although as aforementioned variations will occur. However, a dosage level that is in the range of from about 0.5 mg. to about 10 mg. per kilo is most satisfactory. Such doses may be administered once or twice a day, as required.

For the preparation of the methanobenzazocines of this invention we have found it convenient to use as key intermediates the compounds of Formula II:

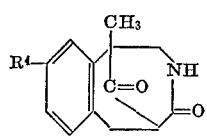

II in which $R^4$ represents a hydrogen atom or a methoxy group. The key intermediate of Formula II in which $R^4$ represents the hydrogen atom is used for the preparation of the methanobenzazocines of this invention of Formula I in which $R^1$ is a hydrogen atom and the key intermediate of Formula II in which $R^4$ represents a methoxy group is used for the preparation of the compounds of Formula I in which $R^1$ is a hydrogen atom, a hydroxyl or methoxy group.

The two key intermediates are prepared by a common sequence of chemical reactions which is schematically represented by FIG. 1:

FIGURE 1

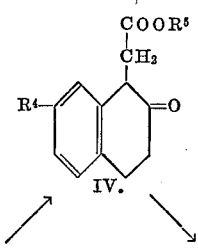

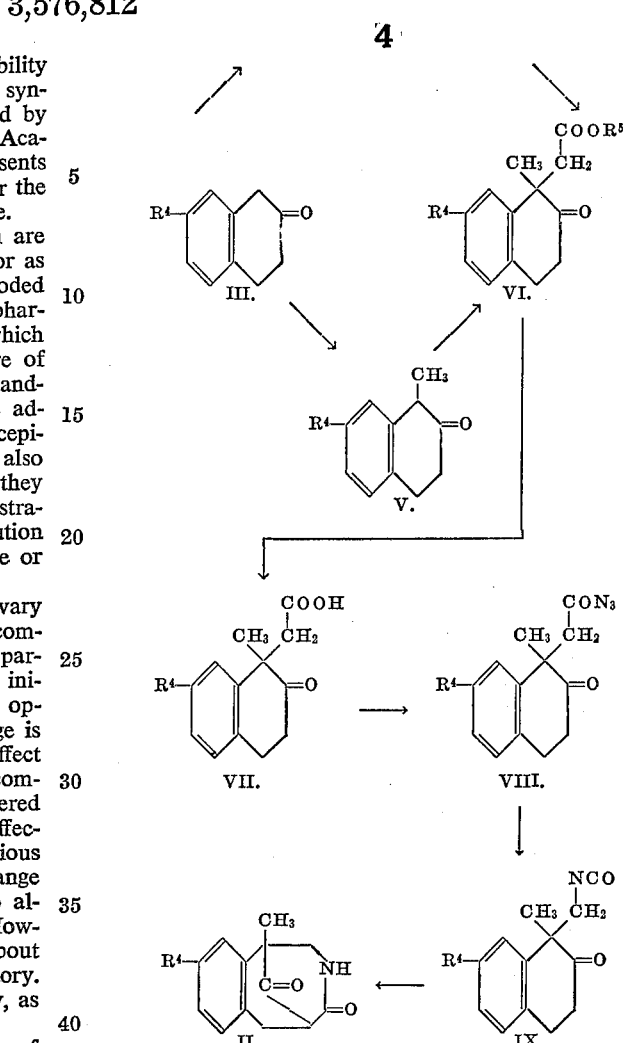

in which $R^4$ is as defined above and $R^5$ represents a lower alkyl, such as, for example, an ethyl group.

In practising the preparation of these two key intermediates, we prefer to use 2-tetralone, described by M. D. Soffer et al. Org. Syntheses, 32, 97 (1952) and 7-methoxy-2-tetralone, described by G. B. Diamond and M. D. Soffer, J. Am. Chem. Soc. 74, 4126 (1952), as starting materials for the intermediates of Formula II in which $R^4$ represents a hydrogen atom or a methoxy group, respectively.

The starting material of Formula III may be converted to the keto ester VI by two methods, which differ only in the order of use of alkylating agents. Thus, the starting material of Formula III may be alkylated according to the method of G. Stork et al., J. Am. Chem. Soc., 85, 207 (1963), via an enamine derivative, for example, the corresponding pyrrolidine enamine, by a lower alkyl ester, such as, for example, the ethyl ester of bromo- or chloroacetic acid to afford the keto ester IV. The keto ester of Formula IV is then transformed to the keto ester VI, by treating the corresponding alkali metal enolate of the former, for example, the sodium enolate, with a methyl halide such as methyl iodide. Alternatively, the same enamine derivative, mentioned above, can be treated with the methyl halide to yield the tetralone V, which after being converted to the corresponding alkali metal enolate, yields the keto ester VI on treatment with a lower alkyl ester, for example, the ethyl ester of bromo- or chloroacetic acid.

The keto ester VI is hydrolyzed by a dilute acid, such as hydrochloric acid or an aqueous solution of an alkali metal hydroxide, such as potassium hydroxide, to yield the corresponding keto acid VII. This acid is converted to the azide VIII by treatment with a lower alkyl chlorocarbonate, such as, for example, ethylcarbonate, in the presence of a base, such as, for example, triethyl amine, followed by sodium azide treatment. The resulting azide VIII rearranges on warming in an inert solvent, such as, for example, toluene, to yield the isocyanate IX, the immediate precursor for the synthesis of the key intermediates of Formula II.

The isocyanate of Formula IX may be converted to the key intermediate of Formula II by p-toluene sulfonic acid in benzene solution according to the method of R. W. Guthrie et al., Tetrahedron Letters, 2945 (1965). However, we have found that the treatment of the isocyanate IX with sodium hydride in an inert solvent, for example, benzene or toluene, gives a much superior yield of the key intermediate of Formula II which is most useful for the preparation of the compounds of this invention.

The methanobenzazocines of this invention of Formula I in which $R^2$ represents a hydrogen atom and $R^1$ and $R^3$ are as defined above are preferably prepared by the following process, which is schematically represented by FIG. 2 in which $R^3$ and $R^4$ are as defined above:

FIGURE 2

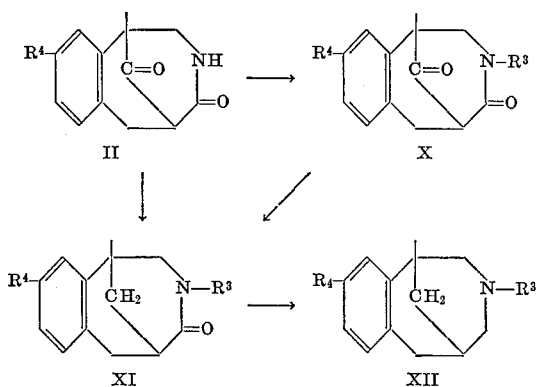

When it is desired to prepare compounds of Formula I in which both $R^2$ and $R^3$ represent an atom of hydrogen, the keto-lactam of Formula II in which $R^4$ is as defined above is first reacted with hydrazine and an alkali metal hydroxide such as, for example, potassium hydroxide, to yield the lactams of Formula XI in which $R^3$ represents hydrogen and $R^4$ is as defined above. Treatment of the latter compounds with lithium aluminum hydride affords the methanobenzazocines of Formula XII in which $R^3$ represents hydrogen and $R^4$ is as defined above.

For the preparation of those compounds in which $R^2$ represents an hydrogen atom and $R^3$ is a substituent other than hydrogen, that is, an organic radicle, we have found it advantageous to first introduce the substituent on the key intermediate II in which $R^4$ is as defined above. This particular N-substitution proceeds smoothly to yield the keto lactams of Formula X when the key intermediate II is treated with an appropriate organic halide of the Formula $R^3X$ in which $R^3$ is an organic radicle as defined above and X is a chlorine, bromine or iodine atom, in the presence of a basic condensing agent, such, for example, sodium hydride, in an inert solvent, such as, for example, benzene.

These keto lactams of Formula X are converted to the lactams of Formula XI by treatment with hydrazine and an alkali metal hydroxide, such, as, for example, potassium hydroxide, in ethylene glycol. Treatment of the latter lactams of Formula XI with lithium aluminum hydride subsequently afford the N-substituted methanobenzazocines of Formula XII which are the methanobenzazocines of this invention within the group represented by Formula I in which $R^1$ represents a hydrogen atom or a methoxy group, $R^2$ represents a hydrogen atom and $R^3$ is an organic radicle as defined above. From this latter group of compounds and the methanobenzazocines of Formula XII in which $R^3$ is hydrogen and $R^4$ is as described above, prepared as described above, the compounds in which $R^1$ represents a methoxy group are O-demethylated with an acidic reagent, such as a mineral acid, for example, hydrobromic acid, or a Lewis acid, such as aluminum tribromide, a Grignard reagent such as methyl magnesium iodide, according to the procedure of A. L. Wilds and W. B. McCormack, J. Am. Chem. Soc. 70, 4127 (1948), or in basic media using, for example, lithium diphenylphosphide according to the procedure of K. B. Mallion and F. G. Mann, Chemistry and Industry, 1558 (1963) or using sodium borohydride and iodine according to the method of L. H. Long and G. F. Freeguard, Nature, 207, 403 (1965), to yield the methanobenzazocines of Formula I in which $R^1$ represents a hydroxy group, $R^2$ represents a hydrogen atom and $R^3$ is as defined above.

The methanobenzazocines of this invention of Formula I in which $R^2$ represents a methyl group, and $R^1$ and $R^3$ are as defined above are preferably prepared by the following process, which are schematically represented by FIGURE 3 ($R^3$ and $R^4$ are as defined above):

FIGURE 3

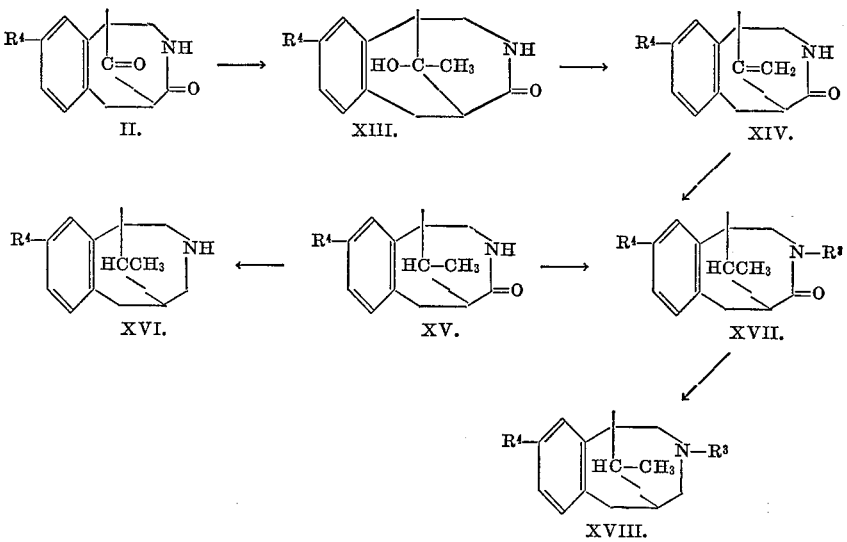

The key intermediates of Formula II in which $R^4$ represents a hydrogen or a methoxy group are reacted with methyl Grignard reagent, for example, methyl magnesium bromide, to yield a mixture of geometrical isomers of the hydroxy lactams of Formula XIII as a result of the newly introduced asymmetric center at position 11. However, this reaction proceeds stereoselectively and the preponderant isomer may be purified and separated from the other isomer by conventional means such as crystallization and chromatography. The preponderant isomers of the hydroxy lactams of Formula XIII or the mixtures of the geometrical isomers of Formula XIII are treated with a dehydrating agent, such as, for example, thionyl chloride in pyridine, to yield the olefin derivatives of Formula XIV. These olefin derivatives are hydrogenated in the presence of a noble metal catalyst, such as, platinum oxide, to yield a mixture of geometrical isomers of the C-methyl lactams of Formula XV as a result of the newly introduced asymmetric center at position 11. This mixture is not separated at this stage but is used, as such, for the subsequent reduction to yield the methanobenzazocines of Formula XVI which are again obtained as a mixture of geometrical isomers. These isomers may be readily separated by conventional means, such as crystallization, chromatography, or fractional crystallization of their acid addition salts and are distinguishable by their different physical properties. For convenience these two isomers are designated as A and B.

Two methods may be used for the conversion of the C-methyl lactams of Formula XV to the N-substituted 1,5-methanobenzazocines of Formula XVIII. By the first method, the C-methyl lactam of Formula XV is reduced with lithium aluminum hydride to the amine of Formula XVI, which is then readily N-alkylated with an appropriate organic halide of the formula $R^3X$ as defined above in the presence of a basic condensing agent, such as, sodium hydride, in an inert solvent, for example, tetrahydrofuran, to give the desired N-substituted methanobenzazocine of Formula XVIII. By the second method, the C-methyl lactam of Formula XV is N-alkylated with the appropriate organic halide of Formula $R^3X$ according to the alkylation procedure just described in the first method, to yield the lactam of Formula XVII, which on reduction with lithium aluminum hydride also yields the desired N-substituted methanobenzazocines of Formula XVIII.

As a further alternative procedure for the preparation of the N-substituted methanobenzazocines of Formula XVIII, the N-substituted keto lactams of Formula X, described previously, may be subjected to the sequence of reactions, (a) Grignard reaction, (b) dehydration, (c) hydrogenation under the same conditions described for the key intermediate II in the preceding paragraph.

Both the N-substituted and N-unsubstituted methanobenzazocines of Formula XVIII are the compounds of this invention within the group represented by Formula I in which $R^1$ represents a hydrogen atom or a methoxy group, $R^2$ represents a methyl group and $R^3$ is as defined above. From this latter group of compounds, the compounds in which $R^1$ represents a methoxy group are O-demethylated according to the methods described above to yield the methanobenzazocines of this invention of Formula I in which $R^1$ represents a hydroxy group, $R^2$ represents a methyl group and $R^3$ is as defined above.

The methanobenzazocines of this invention of Formula I in which $R^2$ represents a hydroxy group and $R^1$ and $R^3$ are as defined above are preferably prepared by the following process which is schematically represented by FIG. 4 ($R^3$ and $R^4$ are as defined above):

FIGURE 4

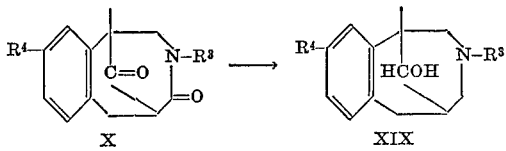

The intermediates of Formula X, obtained as described above, may be reduced with lithium aluminum hydride to yield directly a mixture of the two possible stereoisomers of the methanobenzazocines of Formula XIX. The mixture of stereoisomers obtained are a result of the newly introduced asymmetric centre at position 11. These stereoisomers may be separated by conventional methods such as chromatography or crystallization of the free bases or their acid salts. The stereoisomers are designated as A and B for the sake of convenience and are distinguished from each other by their difference in physical constants.

The benzoazocines of Formula XIX in which $R^3$ represents a hydrogen atom and $R^4$ is as defined above, obtained by the preceding method, are also useful as intermediates for preparing the N-substituted methanobenzazocines of Formula XIX. Application for this use is performed by N-alkylating these benzoazocines by the procedure described for preparing the N-substituted methanobenazocines of Formula XVIII, see above, to yield the N-substituted methanobenzazocines of Formula XIX.

The N-substituted and N-unsubstituted methanobenzoazocines of Formula XIX are the compounds of this invention within the group represented by Formula I in which $R^1$ represents a hydrogen atom or a methoxy group, $R^2$ represents a hydroxy group and $R^3$ is as defined above. From this latter group of compounds, the compounds in which $R^1$ represents a methoxy group are O-demethylated, either by the use of a Grignard reagent or in a basic media, as described above, to yield the methanobenzazocines of this invention of Formula I in which $R^1$ and $R^2$ represent a hydroxy group and $R^3$ is as defined above.

The methanobenzazocines of this invention of Formula I in which $R^2$ represents an amino group are prepared by the following processes which are schematically represented by Figure 5 ($R^3$ and $R^4$ are as defined above):

FIGURE 5

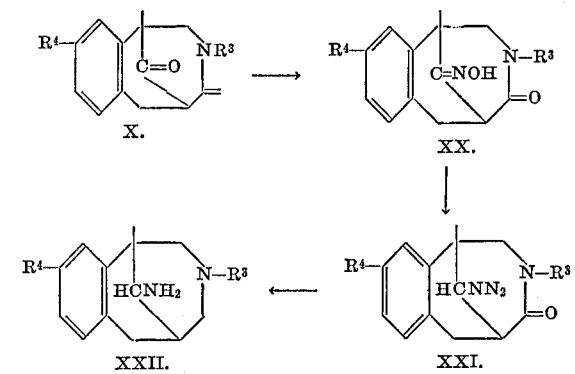

The intermediates of Formula X in which $R^3$ and $R^4$ are as defined above, prepared as described above, are reacted with hydroxylamine to yield the oxime lactams of Formula XX. These oxime lactams of Formula XX may be reduced directly with lithium aluminum hydride to afford the methanobenzazocines of Formula XXII. Alternatively, the latter compounds may be prepared by a two-step reduction process in which the oxime group of the oxime lactams of Formula XX is first reduced by a catalytic reduction using a noble metal catalyst, such as, for example, platinum oxide, followed by treatment with lithium aluminum hydride of the resulting amino lactam of Formula XXI. Reduction of the oxime group of the oxime lactams of Formula XX by either of the processes just described readily yields a pure geometrical isomer on purification of the reduction product. Although these reductive processes could yield a mixture of two epimers as a result of the newly introduced asymmetric center at position 11, they apparently proceed with a high degree of stereoselectivity.

Both the N-unsubstituted and the N-substituted methanobenzazocines of Formula XXIII are the compounds of this invention within the group represented by Formula I in which $R^1$ represents a hydrogen atom or a methoxy group, $R^2$ represents an amino group and $R^3$ is as defined above. From this latter group of compounds, the compounds in which $R^1$ represents a methoxy group are demethylated according to the procedures described above to yield the compounds of this invention of Formula I in which $R^1$ represents a hydroxy group, $R^2$ represents an amino group and $R^3$ is as defined above.

Generally speaking, the aforementioned processes are readily applicable for the preparation of the methanobenzazocines of this invention. However, it may sometimes not be convenient to introduce the substituent $R^3$ in the direct manner described above, and in such cases it might be preferable to acylate an intermediate of Formula XXIII, in which $R^4$ is as defined above and $R^2$ represents hydrogen, the methyl or the hydroxy group with the appropriate acylating agent, for example the appropriate acyl halide. The acylated intermediate, for example, a compound of Formula XXIV may then be reduced with lithium aluminum hydride to yield the desired compound, for example, a compound of Formula XXV. This procedure is particularly advantageous when preparing the compounds of Formula I in which $R^3$ represents the cyclopropylmethyl group because of the difficulties encountered in preparing pure cyclopropylmethyl halides as described by M. C. Caserio et al., Tetrahedron, 11, 171 (1960). In this case an intermediate of Formula XXIII in which $R^2$ and $R^4$ are as defined above is treated with a cyclopropylcarbonyl halide such as, for example, cyclopropylcarbonyl chloride to yield the correspondingly acylated derivative of Formula XXIV. If $R^2$ in this reaction represents the hydroxy group it will also be acylated in this step but this acyl group will be removed in the subsequent reduction with lithium aluminum hydride, whereby the compound of Formula XXV is obtained in which $R^2$ and $R^4$ are as defined above. This process may be illustrated by the following formulae shown in Figure 6.

FIGURE 6

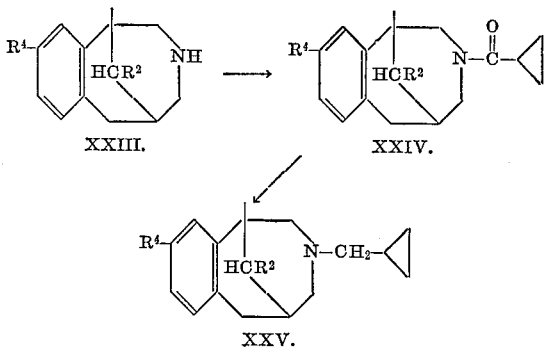

The latter compounds in which $R^4$ represents a methoxy group are O-demethylated either by the use of a Grignard reagent or in a basic media, as described above, to yield the corresponding methanobenzazocines of this invention of Formula I in which $R^1$ represents a hydroxy group.

The following examples will illustrate the scope of this invention.

EXAMPLE 1

7-methoxy-2-tetralone (23.5 g.) in benzene (25 ml.) under dry nitrogen is treated with pyrrolidine (15 ml.) and boiled for four hours, utilizing a Dean-Stark apparatus. The solution of the resulting tetralone enamine $(\nu_{max.}^{CHCl_3}$ 1600, 1575 cm.$^{-1})$ is cooled in ice, treated with ethyl bromoacetate (40 ml.), and then heated to reflux for 24 hours. The resulting lower phase of benzene insoluble immonium salt $(\nu_{max.}^{CHCl_3}$ 1650, 1605 cm.$^{-1})$ is separated, rinsed with benzene (2× 50 ml.) and then heated for one hour with 200 ml. of ethanol. The solution is concentrated and the resulting residue is partitioned between benzene (100 ml.) and water (250 ml.); the organic phase is dried, evaporated, and the residue distilled. The fraction boiling from 164–168° C. at 2 mm. pressure is identified at 1,2,3,4 - tetrahydro - 2-oxo-7- methoxy - 1 - naphthaleneacetic acid ethyl ester (IV, $R^4=CH_3O$ and $R^5=C_2H_5$);

$\nu_{max.}^{CHCl_3}$ 1720 (unresolved) cm.$^{-1}$ $\tau^{CDCl_3}$ 7.0 (d), 5.85 (q) 8.75 (t).

In the same manner, but using an equivalent amount of 2-tetralone instead of 7-methoxy-2-tetralone, 1,2,3,4-tetrahydro-2-oxo-1-naphthaleneacetic acid ethyl ester is obtained.

In the same manner, but using an equivalent amount of methyl iodide instead of ethyl bromoacetate, 7-methoxy-1-methyl-2-tetralone (V, $R^4=OCH_3$) is obtained.

In the same manner, but using equivalent amounts of 2-tetralone and methyl iodide for 7-methoxy-2-tetralone and ethyl bromoacetate, respectively, 1-methyl-2-tetralone (V, $R^4=H$) is obtained.

In the same manner, but using methyl bromoacetate instead of ethyl bromoacetate, the corresponding 1,2,3,4-tetrahydro-2-oxo-1-naphthaleneacetic acid methyl ester and its 7-methoxy derivative are also obtained.

EXAMPLE 2

In a dry nitrogen atmosphere, 1,2,3,4-tetrahydro-2-oxo-7-methoxy-1-naphthaleneacetic acid ethyl ester, prepared as described in Example 1 (30.0 g.) in dry benzene (150 ml.) is treated with sodium hydride (5.5 g. of 55% dispersion in oil) and stirred for six hours at room temperature. Methyl iodide (20 ml.) is now added and the mixture is boiled for 18 hours. After cooling, the mixture is washed with ice-water, dried over magnesium sulfate, filtered and evaporated. The residue is distilled to yield a fraction boiling from 150–170° C. at 2 mm., identified as 1,2,3,4-tetrahydro-2-oxo-7-methoxy-1-methyl-1-naphthaleneacetic acid ethyl ester (VI, $R^4=OCH_3$ and $R^5=C_2H_5$);

$\nu_{max.}^{CHCl_3}$ 1735, 1720 cm.$^{-1}$ $\tau^{CDCl_3}$ 8.65 (s), 6.0 (q), 8.9 (t).

In the same manner, but using an equivalent amount of 1,2,3,4-tetrahydro-2-oxo-1-naphthaleneacetic acid instead of 1,2,3,4 - tetrahydro - 2-oxo-7-methoxy-1-naphthaleneacetic acid ethyl ester, 1,2,3,4-tetrahydro-2-oxo-1-methyl-1-naphthaleneacetic acid ethyl ester (VI, $R^4=H$ and $R^5=C_2H_5$) is obtained.

In the same manner, but using equivalent amounts of 7-methoxy-1-methyl-2-tetralone and ethyl bromoacetate instead of 1,2,3,4-tetrahydro-2-oxo-7-methoxy-1-naphthaleneacetic acid ethyl ester and methyl iodide, respectively, 1,2,3,4 - tetrahydro-2-oxo-7-methoxy-1-methyl-1-naphthaleneacetic acid ethyl ester is again obtained.

In the same manner, but using equivalent amounts of 1-methyl-2-tetralone and ethyl bromoacetate instead of 1,2,3,4 - tetrahydro-2-oxo-7-methoxy-1-naphthaleneacetic acid ethyl ester and methyl iodide, respectively, 1,2,3,4-tetrahydro-2-oxo-1-methyl-1-naphthaleneacetic acid ethyl ester is again obtained.

In the same manner, but using the corresponding methyl esters as starting materials, 1,2,3,4-tetrahydro-2-oxo-1-methyl-1-naphthaleneacetic acid methyl ester and its 7-methoxy derivatives are also obtained.

EXAMPLE 3

1,2,3,4-tetrahydro-2-oxo-7-methoxy-1-naphthaleneacetic acid ethyl ester, prepared as described in Example 2 (20 g.) in ethanol (100 ml.) containing aqueous potassium hydroxide (40 ml. of a 20% w./v.) is boiled for one hour. After cooling, the mixture is diluted with distilled water (250 ml.), extracted with dichloromethane, adjusted to pH 2 with concentrated hydrochloric acid, and re-extracted with dichloromethane (3× 50 ml.). The organic extract is dried using magnesium sulfate, filtered, and evaporated to a gum which is crystallized from benzene to afford 1,2,3,4 - tetrahydro - 2 - oxo-7-methoxy-1-methyl-1-naphthaleneacetic acid (VII, $R^4=OCH_3$), M.P. 111–115° C.

In the same manner, but using an equivalent of 1,2,3,4-tetrahydro-2-oxo-1-methyl-1-naphthaleneacetic acid ethyl ester, 1,2,3,4 - tetrahydro-2-oxo-1-methyl-1-naphthaleneacetic acid (VII, $R^4=H$) is obtained.

The same compounds are also obtained when the methyl ester of the starting materials are used.

EXAMPLE 4

To a solution of 1,2,3,4-tetrahydro-2-oxo-7-methoxy-1-methyl-1-naphthaleneacetic acid (3 g.) prepared as described in Example 3 in dry tetrahydrofuran (25 ml.) magnetically stirred at −5° C., is successively added triethylamine (2.0 ml.), ethyl chloroformate (1.25 ml.), and, after two hours, sodium azide (1.85 g.) in distilled water (3 ml.). After a further one hour, below 0° C., the reaction mixture is diluted with dichloromethane (50 ml.), filtered, dried using magnesium sulfate, and evaporated to yield the oily acid azide VIII ($R^4=OCH_3$), $$\nu_{max.}^{CHCl_3} \ 2160, 1715 \ cm.^{-1}$$

The oily acid azide is heated at 50° C. in dry toluene (50 ml.) for one hour to yield the isocyanate IX ($R^4=OCH_3$), $$\nu_{max.}^{CHCl_3} \ 2250 \ cm.^{-1}$$

The cooled solution of the isocyanate is treated with 1.1 g. of sodium hydride and then refluxed. After one hour, a vigorous evolution of gas occurs concurrently with the development of a deep yellow color and the formation of a gelatinous precipitate. Heating is maintained during a further one hour. The cooled reaction mixture is treated with ice water (250 ml.), the organic phase separated, dried using magnesium sulfate, and evaporated. The residue is crystallized from benzene and then ethanol to afford the keto lactam II ($R^4=CH_3O$), 1,2,5,6-tetrahydro-9-methoxy-1-methyl - 1,5 - methano-3-benzazocine-4,11(3H)-dione, M.P. 213–215° C.

In the same manner, but using an equivalent amount of 1,2,3,4-tetrahydro-2-oxo-1-methyl-1-naphthaleneacetic acid instead of 1,2,3,4-tetrahydro-2-oxo - 7 - methoxy-1-methyl-1-naphthalene-acetic acid, the keto lactam II ($R^4=H$), 1,2,5,6-tetrahydro-1-methyl - 1,5 - methano-3-benzazocine-4,11(3H)-dione, is obtained.

EXAMPLE 5

The keto lactam II ($R^4=CH_3O$), 1.0 g., prepared as described in Example 4 and sodium hydride (190 mg., 55% dispersion in oil) in dry benzene (80 ml.) is boiled for 30 minutes and then treated with the organic halide, methyl iodide (2 ml.). After boiling for an additional two hours, the reaction mixture is cooled and treated with ice water (250 ml.). The organic phase is separated, dried over magnesium sulfate, and evaporated. The residue is recrystallized from benzene and then ethanol to afford the corresponding N-methyl keto lactam X ($R^3=CH_3$ and $R^4=CH_3O$), 1,2,5,6-tetrahydro-9-methoxy-1,3-dimethyl-1,5-methano-3-benzazocine-4,11(3H)-dione, M.P. 169–171° C.

In the same manner, but using an equivalent amount of the appropriate organic halide of formula $R^3X$ in which $R^3$ and X are as defined above instead of methyl iodide, the N-allyl-, N-(3,3-dimethylallyl)-, N-cyclopropylmethyl-, N - anilinoethyl-, N - (3 - anilinopropyl)-, N-phenethyl-, N-(3-phenylpropyl)-, N-(2-hydroxyphenethyl)-, N-(3-hydroxy - 3 - phenylpropyl)-, N-phenacyl-, N-(3-oxo - 3 - phenylpropyl)-, N-cinnamyl-N-(p-aminophenethyl)-, and N-[3-(p-aminophenyl)-propyl]-1,2,5,6-tetrahydro - 9 - methoxy-1methyl-1,5-methano-3-benzazocine-4,11(3H)-dione of Formula X are obtained.

In the same manner, but using an equivalent amount of the keto lactam II ($R^4=H$) instead of the keto lactam II ($R^4=CH_3O$) and an equivalent amount of the appropriate organic halide of formula $R^3X$, defined as above, the N-methyl-, N-allyl-,N-(3,3-dimethylallyl)-, N-cyclopropylmethyl-, N-anilinoethyl-, N - (3 - anilinopropyl)-, N-phenethyl-, N-(3-phenylpropyl)-, N-phenethyl-, N-(3-phenylpropyl)-, N-(2-hydroxyphenethyl)-, N-(3-hydroxy-3-phenylpropyl)-, N-phenacyl-, N-(3-oxo-3-phenylpropyl)-, N-cinnamyl-, N-(p-aminophenethyl)-, and N-[3-(p-aminophenyl)-propyl] - 1,2,5,6 - tetrahydro-1-methyl-1,5-methano-3-benzazocine-4,11(3H)-dione of the Formula X are obtained.

EXAMPLE 6

In a dry nitrogen atmosphere, the N-methyl keto lactam X ($R^3=CH_3$ and $R^4=CH_3O$), 1,2,5,6-tetrahydro-9-methoxy-1,3-dimethyl - 1,5 - methano-3-benzazocine-4,11 (3H)-dione, prepared as described in Example 5 (6.0 g.), and hydrazine (6 ml. of 99%) in dry ethylene glycol (60 ml.) are heated to 150° C. The mixture is now treated with portions of potassium hydroxide over a period of 40 minutes. Heating is continued for an additional one hour. The mixture is then poured into crushed ice (150 g.) and extracted with dichloromethane (3× 100 ml.). The organic extract is dried using magnesium sulfate, and evaporated to dryness. The residue is crystallized from benzene to yield the lactam XI ($R^3=CH_3$ and $R^4=CH_3O$), 1,2,5,6-tetrahydro-9-methoxy-1,3-dimethyl-1,5-methano-3-benzazocin-4(3H)-one, M.P. 118–120° C.

In the same manner, but using an equivalent amount of the appropriate keto lactam of Formula X in which $R^3$ and $R^4$ are as defined above instead of the N-methyl keto lactam X ($R^3=CH_3$ and $R^4=CH_3O$), the lactams of Formula XI, 1,2,5,6-tetrahydro-1-methyl-1,5-methano-3-benzazocin-4(3H)-one, 1,2,5,6-tetrahydro-9-methoxy-1-methyl - 1,5 - methano-3-benzazocin-4(3H)-one, N-allyl-, N-(3,3-dimethylallyl)-, N-cyclopropylmethyl-, N-anilinoethyl-, N-(3-anilinopropyl)-, N-phenethyl-, N-(3-phenylpropyl)-, N - (2 - hydroxyphenethyl)-, N-(3-hydroxy-3-phenylpropyl)-, N-phenacyl-, N-(3-oxo-3-phenylpropyl)-, N-cinnamyl-, N - (p - aminophenethyl)-, N-[3-(p-aminophenyl)-propyl] - 1,2,5,6 - tetrahydro - 9 - methoxy--1-methyl - 1,5 - methano-3-benzazocin-4(3H)-one, respectively, and N-methyl, N-allyl-, N(3,3-dimethylallyl)-, N-cyclopropylmethyl-, N-anilinoethyl-, N-(3-anilinopropyl)-, N-phenethyl-, N-(3-phenylpropyl)-, N-(2-hydroxyphenethyl)-, N-(3-hydroxy - 3 - phenylpropyl)-, N-phenacyl-, N-(3-oxo-3-phenylpropyl)-, N-cinnamyl-, N-(p-aminophenethyl)-, and N-[3-(p-aminophenyl)-propyl]-1,2,5,6-tetrahydro-1-methyl - 1,5 - methano-3-benzazocin-4(3H)-one, respectively, are obtained.

EXAMPLE 7

To a stirred solution of 1,2,5,6-tetrahydro-9-methoxy-1,3-dimethyl - 1,5 - methano-3-benzazocin-4(3H) - one (4.8 g.) prepared as described in Example 6, in dry tetrahydrofuran (50 ml.), lithium aluminum hydride (1.5 g.) is added. The mixture is subjected to reflux for three hours.

The cooled mixture is added to saturated sodium potassium tartrate (250 ml.) and extracted with chloroform (3× 50 ml.). The chloroform layer is extracted with dilute hydrochloric acid (2× 50 ml.) which is then rendered alkaline and extracted with chloroform (3× 50 ml.). This chloroform extract is dried over magnesium sulfate, filtered and concentrated to yield an oily base, 1,2,3,4,5,6 - hexahydro - 9 - methoxy-1,3-dimethyl-1,5-methano-3-benzazocine, (XII, $R^3=CH_3$, $R^4=OCH_3$), $\tau^{CDCl_3}$ 7.7 (s) 8.72 (s), which is converted to its hydrochloride acid addition salt with M.P. 265° C.

In the same manner, but using an equivalent amount the appropriate lactam of Formula XI, prepared as described in Example 6, instead of 1,2,5,6-tetrahydro-9-methoxy-1,3-dimethyl - 1,5-methano-3-benzazocin-4(3H)-one, the 1,5-methano-3-benzazocines of Formula XII, 1,2,3,4,5, 6-hexahydro-1-methyl - 1,5-methano-3-benzazocine, 1,2,3, 4,5,6-hexahydro-9-methoxy-1-methyl - 1,5 - methano-3-benzazocine, N-allyl-, N-(3,3-dimethylallyl)-, N-cyclopropylmethyl-, N-anilinoethyl-, N-(3-anilinopropyl)-, N-phenethyl-, N-(3 - phenylpropyl)-, N-(2 - hydroxyphenethyl)-, N-(3-hydroxy-3-phenylpropyl)-, N-phenacyl-, N-(3-oxo-3-phenylpropyl)-, N-cinnamyl-, N-(p-aminophenethyl)-, N-[3-(p-aminophenyl) - propyl]-1,2,3,4,5,6-hexahydro-9-methoxy - 1 - methyl-1,5-methano-3-benzazocine, respectively, and N-methyl-, N-allyl, N-(3,3-dimethylallyl)-N-cyclopropylmethyl-, N-anilinoethyl-, N-(3-anilinoethyl-, N-(3-anilinopropyl)-, N-phenethyl-, N-(3-phenylpropyl)-, N-(2-hydroxyphenethyl)-, N-(3-hydroxy-3-phenylpropyl)-, N-phenacyl-, N-(3-oxo-3-phenylpropyl)-, N-cinnamyl-, N-(p-aminophenethyl)-, and N-[3(p-aminophenyl)-propyl]-1,2,3,4,5,6-hexahydro - 1 - methyl-1,5-methano-3-benzazocine, respectively, are obtained.

EXAMPLE 8

1,2,3,4,5,6-hexahydro - 9 - methoxy-1,3-dimethyl-1,5-methano-3-benzazocine (300 mg.), prepared as described in Example 7, and hydrobromic acid (4 ml. of 48%) are boiled for 30 minutes. After cooling, thhe mixture is rendered alkaline with dilute ammonium hydroxide and extracted with chloroform. The chloroform extract is dried over magnesium sulfate, filtered and evaporated to dryness. The oily residue is crystallized from isopropanol and ether to afford crystalline 1,2,3,4,5,6-hexahydro-1,3-dimethyl-1,5-methano - 3 - benzazocin-9-ol (I, $R^1$=OH, $R^2$=H and $R^3$=$CH_3$), M.P. 172° C. The hydrochloric acid addition salt has M.P. 276° C.

In the same manner, but using an equivalent amount of the appropriate 1,5-methano-3-benzazocine of Formula XII in which $R^4$ is a methoxy group, prepared as described in Example 7, instead of 1,2,3,4,5,6-hexahydro-9-methoxy-1,3-dimethyl - 1,5 - methano-3-benzazocine, the 1,5-methano-3-benzoazocines of Formula XII in which $R^4$ is a hydroxy group, 1,2,3,4,5,6-hexahydro-1-methyl-1,5-methano-3-benzazocin-9-ol, N-allyl-, N-(3,3-dimethylallyl)-, N-anilinoethyl-, N-(3-anilinopropyl)-, N-phenethyl-, N-(3-phenylpropyl)-, N-(2-hydroxyphenethyl)-, N-(3-hydroxy-3-phenylpropyl)-, N-phenacyl-, N-(3-oxo-3-phenylpropyl)-, N-cinnamyl-, N-(p-aminophenethyl)-, and N-[3-(p-aminophenyl)-propyl]-1,2,3,4,5,6 - hexahydro-1-methyl-1,5-methano-3-benzazocin-9-ol, are obtained.

EXAMPLE 9

By following the same procedure as described in Example 8, and using as starting material an equivalent amount of the appropriate 1,5-methano-3-benzazocine of Formula XII in which $R^4$ is a methoxy group, prepared as described in Example 7, but using either (a) methyl magnesium iodide (prepared from 51 mg. of magnesium and 0.16 ml. of methyl iodide in 3 ml. of ether) and heating to 180° C. for two hours, (b) lithium diphenylphosphide (prepared from 63 mg. of butyl lithium and 188 mg. of diphenylphosphine) in ether solution for 24 hours at room temperature or (c) a solution of iodine (180 mg.) and sodium borohydride (10 mg.) in carbon tetrachloride (20 ml.) at reflux temperature for four hours, instead of hydrobromic acid at reflux temperature for 30 minutes, the 1,5-methano-3-benzoazocines of Formula XII in which $R^4$ is a hydroxyl group, described in Example 8, and in addition, N-cyclopropylmethyl-1,2,3,4,5,6-hexahydro-1-methyl-1,5-methano-3-benzazocin - 9 - ol, are obtained.

EXAMPLE 10

The keto lactam X($R^3$=$CH_3$ and $R^4$=$CH_3O$), 500 mg., methyl magnesium bromide (7 ml. of a 3 N ethereal solution) and 20 ml. of dry tetrahydrofuran is boiled for 30 minutes. The reaction mixture is cooled and poured into ice water (200 ml.) and extracted with chloroform (3 × 125 ml.). The chloroform extract is dried over magnesium sulfate, filtered, and concentrated to dryness. The oily residue is crystallized from isopropanol and ether to afford 250 mg. of 1,2,5,6-tetrahydro-11-hydroxy-9-methoxy-1,3,11-trimethyl-1,5 - methano-3-benzazocin - 4(3H)-one (XIII, $R^3$=$CH_3$ and $R^4$=$CH_3O$), M.P. 240–241° C.

In the same manner, but using an equivalent amount of the keto lactam II ($R^4$=H) or the keto lactam II ($R^4$=$CH_3O$) instead of the keto lactam X ($R^3$=$CH_3$ and $R^4$=$CH_3O$), 1,2,5,6-tetrahydro - 11 - hydroxy-1,11-dimethyl-1,5-methano-3-benzazocin-4(3H)-one and 1,2,5,6-tetrahydro - 11 - hydroxy-9-methoxy-1,11-dimethyl-1,5-methano-3-benzazocin-4-(3H)-one, M.P. 247–248° C., are obtained, respectively.

EXAMPLE 11

1,2,5,6 - tetrahydro - 11 - hydroxy - 9 - methoxy-1,3,11 - trimethyl - 1,5 - methano - 3 - benzazocin - 4(3H)-one, prepared as described in Example 10, (200 mg). is dissolved in a solution of pyridine (1.0 ml.) and thionyl chloride (2.0 ml.). The reaction mixture is allowed to stand overnight at room temperature and then poured into dilute hydrochloric acid (50 ml. of 10%) and extracted with chloroform. The chloroform extract is washed with dilute hydrochloric acid, dried over magnesium sulfate, filtered and evaporated to dryness to yield 1,2,5,6-tetrahydro - 9 - methoxy - 1,3 - dimethyl - 11 - methylene-1,5-methano-3-benzazocin-4(3H)-one, $\nu_{max}^{CHCl_3}$ 1640, 900 cm.$^{-1}$, $\tau^{CDCl_3}$ 5.03 (d, unresolved) 6.18 (s), 8.42 (s).

In the same manner, but using an equivalent amount of 1,2,5,6 - tetrahydro - 11 - hydroxy - 1,11 - dimethyl-1,5-methano - 3 - benzazocin - 4(3H) - one or 1,2,5,6-tetrahydro - 11 - hydroxy - 9 - methoxy - 1,11 - dimethyl-1,5 - methano - 3 - benzazocin - 4(3H) - one instead of 1,2,5,6-tetrahydro - 11 - hydroxy - 9 - methoxy-1,3,11-trimethyl - 1,5 - methano - 3 - benzazocin-4(H)-3-one, 1,2,5,6-tetrahydro - 1 - methyl - 11 - methylene - 1,5-methano-3-benzazocin - 4(3H) - one (XIV, $R^4$=H) and 1,2,5,6 - tetrahydro - 9 - methoxy - 1 - methyl - 11 - methylene - 1,5 - methano - 3 - benzazocin-4(3H)-one (XIV, $R^4$=$CH_3O$), are obtained, respectively.

EXAMPLE 12

1,2,5,6-tetrahydro - 9 - methoxy - 1,3 - dimethyl-11-methylene - 1,5 - methano - 3 - benzazocin-4(3H)-one prepared as described in Example 11, (12.0 g.) in the presence of platinum oxide (1 g.) in 100 ml. of ethanol is allowed to absorb one equivalent of hydrogen during two hours. The filtered solution is evaporated to dryness to yield 1,2,5,6 - tetrahydro - 9 - methoxy - 1,3,11-trimethyl - 1,5 - methano - 3 - benzazocin-4(3H)-one. The compound is obtained as a mixture of two geometrical isomers, which are not separated at this stage. The mixture, as such, is used in the process described in Example 13.

In the same manner, but using an equivalent of 1,2,5,6-tetrahydro - 1 - methyl - 11 - methylene - 1,5 - methano-3 - benzazocin - 4(3H) - one or 1,2,5,6 - tetrayhydro-9-methoxy - 1 - methyl - 11 - methylene - 1,5 - methano-3 - benzazocin - 4(3H) - one, 1,11 - dimethyl - 1,5-methano - 3 - benzazocin - 4(3H) - one (XV, $R^4$=H) and 1,11 - dimethyl - 9 - methoxy - 1,5 - methano-3-benzazocin-4(3H)-one (XV, $R^4$=$CH_3O$) are obtained, respectively. These compounds, obtained as a mixture of two geometrical isomers, are not separated but used, as such, in the processes described in Examples 13 and 14.

EXAMPLE 13

Following the procedure described for Example 7, and using as starting material an equivalent amount of 1,2,5,6-tetrahydro - 9 - methoxy - 1,3,11 - trimethyl - 1,5-methano - 3 - benzazocin - 4(3H) - one, 1,2,5,6-tetrahydro - 1,3,11 - trimethyl - 1,5 - methano - 3 - benzazocin - 4(3H) - one, 1,2,5,6 - tetrahydro - 9 - methoxy-1,11 - dimethyl - 1,5 - methano - 3 - benzazocin-4(3H)-one or 1,2,5,6 - tetrahydro - 1,11 - dimethyl - 1,5-methano - 3 - benzazocin - 4(3H)-one, prepared as described in Example 12, instead of 1,2,5,6 - tetrahydro-9-methoxy - 1,3 - dimethyl - 1,5 - methano-3-benzazocin-4(3H)-one, 1,2,3,4,5,6 - hexahydro - 1,3,11 - trimethyl-1,5 - methano-3-benzazocine, (XVIII, $R^3$=$CH_3$, $R^4$=H), 1,2,3,4,5,6 - hexahydro - 1,11 - dimethyl - 1,5 - methano-3-benzazocine (XVI, $R^4$=H) and their corresponding 9- methoxy derivatives are obtained as mixtures of geometrical isomers, respectively.

1,2,3,4,5,6 - hexahydro - 9 - methoxy - 1,3,11 - trimethyl-1,5-methano - 3 - benzazocine (XVIII, R³=CH₃, R⁴=OCH₃) is characterized by $\tau^{CDCl_3}$ 6.18 (s), 8.58 (s), 9.05 (d).

EXAMPLE 14

By using in sequence, independent of order, the two manipulative procedures described in Example 5 and Example 7, and using as starting material an equivalent amount of 1,2,5,6 - tetrahydro - 9 - methoxy - 1,11-dimethyl - 1,5 - methano - 3 - benzazocin-4(3H)-one or 1,2,5,6 - tetrahydro - 1,11 - dimethyl - 1,5 - methano-3-benzazocin-4(3H)-one, prepared as described in Example 12, N-methyl-, N-allyl-, N-(3,3-dimethylallyl)-, N-cyclopropylmethyl-, N-anilinoethyl-, N-(3 - anilinopropyl)-, N-phenethyl-, N-(3 - phenylpropyl)-, N-(2-hydroxyphenethyl)-, N-(3-hydroxy - 3 - phenylpropyl)-, N-phenacyl-, N-(3-oxo - 3 - phenylpropyl)-, N-cinnamyl-, N-(p-aminophenethyl)-, N-[3-(p-aminophenyl)-propyl]-1,2,3,4,5,6 - hexahydro - 1,11 - dimethyl - 1,5 - methano-3-benzazocine and their corresponding 9-methoxy derivatives are obtained as mixtures of geometrical isomers, respectively. Those isomers are separated into their respective isomers, A and B, in the manner described in Example 13.

EXAMPLE 15

Following the manipulative procedures described in Examples 8 and 9 and using as a starting material an equivalent amount of the compounds of Formula XVIII in which R³ is as described above and R⁴ is methoxy, prepared as described in Examples 13 and 14, instead of 1,2,3,4,5,6 - hexahydro - 9 - methoxy - 1,3 - dimethyl-1,5 - methano - 3 - benzazocine, 1,2,3,4,5,6 - hexahydro-1,11 - dimethyl -1,5 - methano - 3 - benzazocin - 9 - ol, N-methyl-, N-allyl-, N-(3,3 - dimethylallyl)-, N-anilinoethyl-, N-(3 - anilinopropyl)-, N-phenethyl-, N-(3-phenylpropyl)-, N-(2 - hydroxyphenethyl)-, N-(3 - hydroxy-3-phenylpropyl)-, N-phenacyl-, N-(3 - oxo - 3 - phenylpropyl)-, N-cinnamyl-, N-(p-aminophenethyl)-, and N-[3 - (p-aminophenyl)-propyl] - 1,2,3,4,5,6 - hexahydro-1,11 - dimethyl - 1,5 - methano - 3 - benzazocin - 9 - ol of Formula XVIII (R⁴=OH) are obtained.

Following the manipulative procedures described in Example 9 and using as a starting material an equivalent amount of N-cyclopropyl - 1,2,3,4,5,6 - hexahydro-9-methoxy - 1,11 - dimethyl - 1,5 - methano - 3 - benzazocine, prepared as described in Examples 13 and 14, instead of 1,2,3,4,5,6 - hexahydro - 9 - methoxy - 1,3 - dimethyl-1,5-methano - 3 - benzazocine, N-cyclopropyl-1,2,3,4,5,6-hexahydro - 1,11 - dimethyl - 1,5 - methano-3-benzazocin-9-ol is obtained.

EXAMPLE 16

In a dry nitrogen atmosphere, the keto lactam II (R=CH₃O), 530 mg., prepared as described in Example 4, is dissolved in dry tetrahydrofuran (15 ml.) and treated with lithium aluminum hydride and stirred and refluxed for 17 hours. After cooling the reaction mixture is added to a saturated solution of sodium potassium tartrate and extracted with chloroform (3× 25 ml.). The chloroform extract is in turn extracted with dilute hydrochloric acid (2× 25 ml.), which is then adjusted to pH 10 and extracted with chloroform (3× 25 ml.). This chloroform extract is dried over magnesium sulfate, filtered and evaporated to dryness to yield a mixture of the two possible isomers of C-11 of 1,2,3,4,5,6 - hexahydro-9-methoxy-1-methyl - 1,5 - methano - 3 - benzazocin - 11-ol (XIX, R³=H and R⁴=CH₃O) which is readily separated into the individual isomers by fractional crystallization of the mixture of picrate salts from ethanol. These isomers are arbitrarily designated as A and B and are conveniently obtained as free bases from their corresponding picrate salts by filtration through alumina.

Isomer A:
picrate salt, M.P. 249–252° C. (decomp.) free base, non-crystalline, $\tau^{CDCl_3}$ 8.6 hydrochloride salt, CHCl₃ solvate, M.P. 160° C.

Isomer B:
picrate salt, M.P. 226–228° C.
free base, M.P. 156–158° C.
hydrochloride salt, M.P. 270° C.

In the same manner, but using an equivalent amount of the keto lactam II (R⁴=H) intsead of the keto lactam II (R⁴=CH₃O), the A and B isomers of 1,2,3,4,5,6-hexahydro - 1 - methyl-1,5-methano-3-benzazocin-11-ol, are obtained.

In the same manner, but using an equivalent amount of the appropriate lactam of Formula X in which R³ is an organic radical as defined above and R⁴ is as defined above, prepared as described in Example 5, instead of the keto lactam II (R⁴=CH₃O), the A and B isomers of the N-methyl-, N-allyl-, N-(3,3-dimethylallyl)-, N-cyclopropylmethyl, N-anilinoethyl-, N-(3-anilinopropyl)-, N-phenethyl-, N-(3 - phenylpropyl)-, N-(2-hydroxyphenethyl)-, N-(3 - hydroxy - 3 - phenylpropyl)-, N-phenacyl-, N-(3-oxo - 3 - phenylpropyl)-, N - cinnamyl-, N - (p - aminophenethyl)-, and N-[3 - (p-aminophenyl)-propyl]-derivatives of 1,2,3,4,5,6 - hexahydro - 9 - methoxy-1-methyl-1, 5 - methano - 3 - benzazocin-11-ol and of 1,2,3,4,5,6,7-hexahydro - 1 - methyl - 15 - methano-3-benzazocin-11-ol are obtained.

EXAMPLE 17

The 1,5 - methano - 3-benzazocin-11-ols of Formula XIX, in which R³ is an organic radicle as defined above and R⁴ is as defined above, described in Example 16, may also be prepared by the following process:

Using the procedure described in Example 5, but substituting an equivalent amount of either the A or B isomers of 1,2,3,4,5,6 - hexahydro - 9 - methoxy-1-methyl 1,5-methano - 3 - benzazocin - 11-ol or the A or B isomers of 1,2,3,4,5,6 - hexahydro-1-methyl-1,5-methano-3-benzazocin-11-ol, prepared as described in Example 16, and the appropriate organic halide of formula R³X in which R³ and X are as defined above, the corresponding A and B isomers of the N-methyl-, N-allyl-, N-(3,3-dimethylallyl)-N - cyclopropylmethyl-, N-anilinoethyl-, N-(3 - anilinopropyl)-, N-phenethyl-, N-(3 - phenyl - propyl)-, N-(2-hydroxyphenethyl)-, N-( 3 - hydroxy - 3 - phenylpropyl-, N-phenacyl-, N-(3 - oxo - 3 - phenylpropyl), N-cinnamyl-, N-cinnamyl-, N - (p-aminophenethyl)-, and N-[3 - (p-aminophenyl)-propyl]-derivatives of 1,2,3,4,5,6 - hexahydro - 9 - methoxy -1 - methyl-1,5-methano-3-benzazocin-11-ol and of 1,2,3,4,5,6 - hexahydro-1-methyl-1,5-methano-3-benzazocin-11-ol are obtained.

EXAMPLE 18

By following the procedures described in Example 9 and using as starting materials an equivalent amount of either the A or B isomers the compounds of Formula XIX in which R³ is as described above and R⁴ is methoxy, prepared as described in Example 16, the corresponding A and B isomers of 1,2,3,4,5,6 - hexahydro-1-methyl-1,5-methano - 3 - benzazocin - 9,11-diol and its N-methyl-, N-allyl-, N-(3,3-dimethylallyl)-, N-cyclopropylmethyl-, N-anilinoethyl-, N-(3 - anilinopropyl)-, N-phenethyl-, N-(3-phenypropyl)-, N-(2 - hydroxyphenethyl)-, N-(3 - hydroxy - 3 - phenylpropyl)-, N-phenacyl-, N-(3 oxo - 3 - phenylpropyl)-, N - cinnamyl-, N-(p-aminophenethyl)-, and N-[3 - (p-aminophenyl)-propyl] - derivatives are obtained.

EXAMPLE 19

The keto lactam II (R⁴=CH₃O), 11.0 g., prepared as described in Example 4, dissolved in 200 ml. of ethanol is treated with a solution of sodium acetate (5 g.) in 20 ml.

of water and a solution of hydroxylamine hydrochloride (3.5 g.) in 10 ml. of water. The mixture is boiled for 30 minutes. After cooling, the mixture is diluted with aqueous potassium hydroxide (250 ml. of 4 N) and extracted with dichloromethane (2× 50 ml.). The aqueous phase is neutralized and re-extracted with chloroform (4× 250 ml.). This chloroform extract is dried using magnesium sulfate, filtered and evaporated. The residue is crystallized from ethanol to afford the oxime lactam, 1,2,5,6-tetrahydro-9-methoxy-1-methyl-1,5 - methano - 3 - benzazocin-4,11(3H) - dione 11-oxime (XX, $R^3$=H and $R^4$=$CH_3O$), M.P. 261–262° C.

In the same manner, but using an equivalent amount of the keto lactam II (R=H) or the appropriate keto lactams of Formula X in which $R^3$ is an organic radical as defined above and $R^4$ is hydrogen or a methoxy group, prepared as described in Example 5, instead of the keto lactam II, 1,2,5,6 - tetrahydro - 1 - methyl-1,5-methano-3 - benzazocin - 4,11(3H)-dione 11-oxime, and the oxime lactams of Formula XX, the N-methyl-, N-allyl-, N-(3,3-dimethylallyl)-, N - cyclopropylmethyl-, N-anilinoethyl-, N-(3 - anilinopropyl)-, N-phenethyl-, N-(3 - phenylpropyl)-, N-(2 - hydroxyphenethyl)-, N-(3 - hydroxy - 3-phenylpropyl)-, N-phenacyl-, N-(3-oxo-3-phenylpropyl)-, N-cinnamyl-, N - (p-aminophenethyl)-, and N-[3 - (p-aminophenyl)-propyl]-derivatives of 1,2,5,6 - tetrahydro-9 - methoxy - 1 - methyl - 1,5 - methano - 3 - benzazocine-4,11(3H) - dione - 11 - oxime and of 1,2,5,6 - tetrahydro-1 - methyl - 1,5 - methano -3 - benzazocine - 4,11(3H)-dione 11-oxime, are obtained.

EXAMPLE 20

The oxime lactam XX ($R^3$=H and $R^4$=$CH_3O$), prepared as described in Example 19, 5.5 g. in the presence of platinum oxide (0.3 g.) in 50 ml. of acetic acid is allowed to absorb two moles of hydrogen during four hours. The reaction mixture is then filtered and evaporated to dryness. The residue is partitioned between dilute hydrochloric acid (100 ml.) and chloroform (100 ml.). The aqueous phase is rendered alkaline and extracted with chloroform (3× 50 ml.) which is dried using magnesium sulfate, filtered and evaporated. The residual amide, 1,2,5,6-tetrahydro - 9 - methoxy-1-methyl-4(3H)-oxo-1,5-methano-3-benzazocin - 11 - amine (XXI, $R^3$=H and $R^4$=$OCH)_3$, $\nu_{max.}^{CHCl_3}$ 1680 cm.$^{-1}$ is now reduced with excess lithium aluminum hydride in dry tetrahydrofuran according to the manipulative procedure described in Example 7 to afford the methanobenzazocine, 1,2,3,4,5,6 - hexahydro-9-methoxy-1-methyl-1,5-methano-3-benzazocin-11-amine (XXII, $R^3$=H and $R^4$=$CH_3O$) $\tau^{CDCl_3}$ 6.18 (s) 8.62 (s)

which is further characterized as its hydrochloric acid addition salt, M.P. 255° C.

In the same manner, but using an equivalent amount of 1,2,5,6 - tetrahydro - 1-methyl-1,5-methano-3-benzazocine-4,11(3H)dione 11-oxime or the appropriate oxime lactam of Formula XX in which $R^3$ is an organic radical as described above and $R^4$ is hydrogen or a methoxy group, prepared as described in Example 19, instead of the oxime lactam XX ($R^3$=H and $R^4$=$CH_3O$), 1,2,3,4,5,6-hexahydro-1-methyl-1,5-methano-3-benzazocin-11-amine, and the methanobenzazocines of Formula XXII, the 3-methyl-, 3 - allyl-, 3 - (3,3 - dimethylallyl)-, 3-cyclopropylmethyl-, 3-anilinoethyl-, 3-(3-anilinopropyl)-, 3-phenethyl-, 3-(3-phenylpropyl)- 3-(2-hydroxyphenethyl)-, 3-(3-hydroxy-3-phenylpropyl)-, 3-phenacyl-, 3-(3-oxo-3-phenylpropyl)-, 3-cinnamyl-, 3-(p-aminophenethyl)-, and 3-[3-(p-aminophenyl) - propyl] - derivatives of 1,2,3,4,5,6-hexahydro-9-methoxy - 1 - methyl-1,5-methano-3-benzazocin-11-amine and of 1,2,3,4,5,6 - hexahydro - 1 - methyl-1,5-methano-3-benzazocin-11-amine, are obtained.

EXAMPLE 21

The methanobenzazocines of Formula XXII in which $R^3$ and $R^4$ are as defined above, described in Example 20, may also be prepared by the following process:

Using the procedure described for Example 7, but substituting an equivalent amount of the oxime lactams of Formula XX in which $R^3$ and $R^4$ are as defined above, prepared as described in Example 19, 1,2,3,4,5,6-hexahydro - 9 - methoxy-1-methyl-1,5-methano-3-benzazocin-11-amine, 1,2,3,4,5,6 - hexahydro - 1 - methyl-1,5-methano-3-benzazocin-11-amine, and the 3-methyl-, 3-allyl-, 3-(3,3-dimethylallyl)-, 3-cyclopropylmethyl-, 3-anilinoethyl-, 3-(3 - anilinopropyl)-, 3 - phenethyl-, 3-(3-phenylpropyl)-3-(2 - hydroxyphenethyl)-, 3 - (3-hydroxy-3-phenylpropyl)-, 3-phenacyl-, 3-(3-oxo-3-phenylpropyl)-, 3-cinnamyl-, 3-(p-aminophenethyl)-, and 3 - [3 - (p-aminophenyl)-propyl]-derivatives of 1,2,3,4,5,6-hexahydro-9-methoxy-1-methyl-1,5-methano-3-benzazocin-11-amine and of 1,2,3,4,5,6-hexahydro - 1-methyl-1,5-methano-3-benzazocin-11-amine are obtained.

EXAMPLE 22

Following the manipulative procedures described in Examples 8 and 9 and using as a starting material an equivalent amount of the methanobenzazocines of Formula XXII in which $R^3$ is as defined above and $R^4$ is a methoxy group, prepared as described in Examples 20 and 21, instead of 1,2,3,4,5,6-hexahydro-9-methoxy-1,3-dimethyl-1,5 - methano - 3-benzazocine, 1,2,3,4,5,6-hexahydro-9-hydroxy - 1 - methyl - 1,5 - methano-3-benzazocin-11-amine, 3-methyl-, 3-allyl-, 3-(3,3-dimethylallyl)-, 3-anilinoethyl-, 3 - (3 - anilinopropyl)-, 3-phenethyl-, 3-(3-phenylpropyl)-, 3-(2-hydroxyphenethyl)-, 3-(3-hydroxy-3-phenylpropyl)-, 3-phenacyl-, 3-(3-oxo-3-phenylpropyl)-, 3-cinnamyl-, 3-(p-aminophenethyl)-, and 3 - [3 - (p-aminophenyl)-propyl]-1,2,3,4,5,6 - hexahydro - 9 - hydroxy - 1 - methyl-1,5-methano-3-benzazocin-11-amine are obtained.

Following the manipulative procedures described in Example 9 and using 3-cyclopropyl-1,2,3,4,5,6-hexahydro-9-methoxy-1-methyl-1,5-methano-3-benzazocin - 11 - amine instead of 1,2,3,4,5,6-hexahydro-9-methoxy-1,3-dimethyl-1,5 - methano-3-benzazocine, 3 - cyclopropyl-1,2,3,4,5,6-hexahydro-9-hydroxy-1-methyl- 1,5 - methano - 3 - benzazocin-11-amine is obtained.

EXAMPLE 23

A solution of 1,2,3,4,5,6-hexahydro-9-methoxy-1-methyl-1,5-methano-3-benzazocine (2.0 g.), prepared as described in Example 7, and cyclopropyl carbonyl chloride (2.3 g.) in 20 ml. of pyridine is heated at 60° C. for 18 hours. The cooled reaction mixture is diluted with chloroform (100 ml.) and washed with dilute hydrochloric acid (3× 100 ml. of 10%). The chloroform phase is dried over magnesium sulfate, filtered and concentrated to dryness. The residual amide of Formula XXIV ($R^4$=$CH_3O$ and $R^2$=H), $\nu_{max.}^{CHCl_3}$ 1680 cm.$^{-1}$ 3.2 g., is now reduced with excess lithium aluminum hydride in dry tetrahydrofuran according to the manipulative procedures described in Example 7 to afford N-cyclopropylmethyl - 1,2,3,4,5,6-hexahydro-9-methoxy-1-methyl-1,5 - methano - 3 - benzazocine, (XXV, $R^4$=$CH_3O$ and $R^2$=H)

$\nu_{max.}^{CHCl_3}$ 1020 cm.$^{-1}$ $\nu^{CDCl_3}$8.6(s)

In the same manner, but using an equivalent amount of 1,2,3,4,5,6 - hexahydro - 1-methyl-1,5-methano-3-benzazocine, or 1,2,3,4,5,6-hexahydro-1,11-dimethyl-1,5-methano-3 - benzazocine and 1,2,3,4,5,6 - hexahydro-1-methyl-1,5-methano-3-benzazocin-11-ol and their 9-methoxy derivatives of Formula XXIII, prepared as described above, instead of 1,2,3,4,5,6-hexahydro-9-methoxy-1-methyl-1,5- methano-3-benzazocine, N-cyclopropylmethyl-1,2,3,4,5,6-hexahydro-1-methyl-1,5-methano-3-benzazocine, N-cyclopropylmethyl - 1,2,3,4,5,6 - hexahydro - 1,11-dimethyl-1,5-methano-3-benzazocine, N-cyclopropylmethyl-1,2,3,4,5,6-hexahydro - 1 - methyl - 1,5-methano-3-benzazocin-11-ol. N - cyclopropylmethyl - 1,2,3,4,5,6 - hexahydro - 9 - methoxy-1,11-dimethyl-1,5-methano-3-benzazocine and N-cyclopropylmethyl - 1,2,3,4,5,6 - hexahydro - 9 - methoxy - 1-methyl-1,5-methano-3-benzazocin-11-ol are obtained.

We claim:
1. A compound selected from compounds of the formula

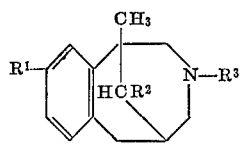

wherein $R^1$ represents hydrogen, hydroxy or methoxy; $R^2$ represents hydrogen, lower alkyl, hydroxy or amino; and $R^3$ represents hydrogen, methyl, allyl, 3,3-dimethylallyl, cyclopropylmethyl, anilinoethyl, 3 - anilinopropyl, phenethyl, 3 - phenylpropyl, 2 - hydroxyphenethyl, 3-hydroxy - 3 - phenylpropyl, phenacyl, 3 - oxo - 3-phenylpropyl, cinnamyl, p-aminophenethyl, or 3 - (p-aminophenyl)propyl; and salts thereof with non-toxic, pharmaceutically acceptable acids.

2. A compound as described in claim 1 which is 1,2,3,4,5,6 - hexahydro - 9 - methoxy - 1,3-dimethyl-1,5-methano-3-benzazocine.

3. A compound as described in claim 1 which is the hydrochloride salt of 1,2,3,4,5,6 - hexahydro - 9 - methoxy-1,3-dimethyl-1,5-methano-3-benzazocine.

4. A compound as described in claim 1 which is 1,2,3,4,5,6 - hexahydro - 1,3 - dimethyl - 1,5-methano-3-benzazocin-9-ol.

5. A compound as described in claim 1 which is the hydrochloride salt of 1,2,3,4,5,6 - hexahydro - 1,3 - dimethyl-1,5-methano-3-benzazocin-9-ol.

6. A compound as described in claim 1 which is 1,2,3,4,5,6 - hexahydro - 9 - methoxy - 1,3,11 - trimethyl-1,5 - methano-3-benzazocine.

7. A compound as described in claim 1 which is 1,2,3,4,5,6 - hexahydro - 9 - methoxy - 1 - methyl - 1,5-methano-3-benzazocin-11-ol.

8. A compound as described in claim 1 which is the hydrochloride salt of 1,2,3,4,5,6 - hexahydro - 9 - methoxy-1-methyl-1,5-methano-3-benzazocin-11-ol.

9. A compound as described in claim 1 which is 1,2,3,4,5,6 - hexahydro - 9 - methoxy - 1 - methyl - 1,5-methano - 3 - benzazocin - 11 - amine.

10. A compound as described in claim 1 which is the hydrochloride salt of 1,2,3,4,5,6 - hexahydro - 9-methoxy-1-methyl-1,5-methano-3-benzazocin-11-amine.

11. A compound as described in claim 1 which is N-cyclopropylmethyl - 1,2,3,4,5,6 - hexahydro - 9-methoxy-1-methyl-1,5-methano-3-benzazocine.

References Cited

UNITED STATES PATENTS

| | | | |
|---|---|---|---|
| 1,915,334 | 6/1933 | Salzberg et al. | 260—243 |
| 2,075,359 | 3/1937 | Salzberg et al. | 424—250 |
| 3,480,638 | 11/1969 | Black et al. | 260 |

HENRY R. JILES, Primary Examiner

S. D. WINTERS, Assistant Examiner

U.S. Cl. X.R.

260—239.3, 240, 293, 313.1, 326.5, 349, 453, 469, 515; 424—267